(12) United States Patent
Feldstein (10) Patent No.: US 8,254,838 B2
(45) Date of Patent: Aug. 28, 2012

(54) RF WIRELESS DEVICE INCLUDING AN INFRARED BEACON FOR PRESENCE DETECTION

(75) Inventor: George Feldstein, Cresskill, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 552 days.

(21) Appl. No.: 12/466,854

(22) Filed: May 15, 2009

(65) Prior Publication Data

US 2010/0291880 A1 Nov. 18, 2010

(51) Int. Cl.
*H04B 7/00* (2006.01)
(52) U.S. Cl. .................. 455/41.2; 455/41.3; 455/77
(58) Field of Classification Search .............. 455/41.2, 455/41.3, 77; 398/116; 381/77
See application file for complete search history.

(56) References Cited

U.S. PATENT DOCUMENTS

| 7,016,325 | B2 | 3/2006 | Beasley |
| 7,151,764 | B1 | 12/2006 | Heinonen |
| 7,509,417 | B1 | 3/2009 | Kammer |
| 2002/0142771 | A1 | 10/2002 | Saifullah |
| 2004/0106377 | A1* | 6/2004 | Van Der Winkel et al. .. 455/41.2 |
| 2009/0125984 | A1 | 5/2009 | Bilger |

* cited by examiner

*Primary Examiner* — John Poos
(74) *Attorney, Agent, or Firm* — Crestron Electronics Inc.

(57) ABSTRACT

A portable RF wireless device (41), such as a microphone, is provided with an infrared beacon in order to signal a connection request to a wireless communication access point (48) using a first IR code (401). In response to this first IR code, the wireless communication access point broadcasts an RF inquiry message (101) that is responded (102) to by the portable RF wireless device in order to establish an RF communication link. After the RF communication link is established, the portable RF wireless device conditionally transmits a second IR code to verify that it is still collocated in the local vicinity of the wireless communication access point, such as being in the same room.

35 Claims, 7 Drawing Sheets

RF WIRELESS DEVICE INCLUDING AN INFRARED BEACON FOR PRESENCE DETECTION

BACKGROUND OF THE INVENTION

1. Technical Field

The present invention relates to networks of devices that can be connected using wireless links, in particular devices that use the Bluetooth technology. Specifically, embodiments of the present invention pertain to a method and system for selecting and connecting to wireless access point within a local area network.

2. Background Art

One prevalent technology for wireless distribution of audio and data is Bluetooth, where its popularity is based on it providing a high-performance, yet low-cost, integrated radio transceiver. Bluetooth protocol is known in the art as a short range (10 meter) frequency-hopping radio link between devices. These devices are then termed "Bluetooth-enabled". Bluetooth is a trademark owned by Bluetooth SIG, Inc. Bluetooth technology allows Bluetooth devices to "discover" other Bluetooth devices that are within range and then connect with those devices, either automatically or at a user's discretion.

Figure 1:
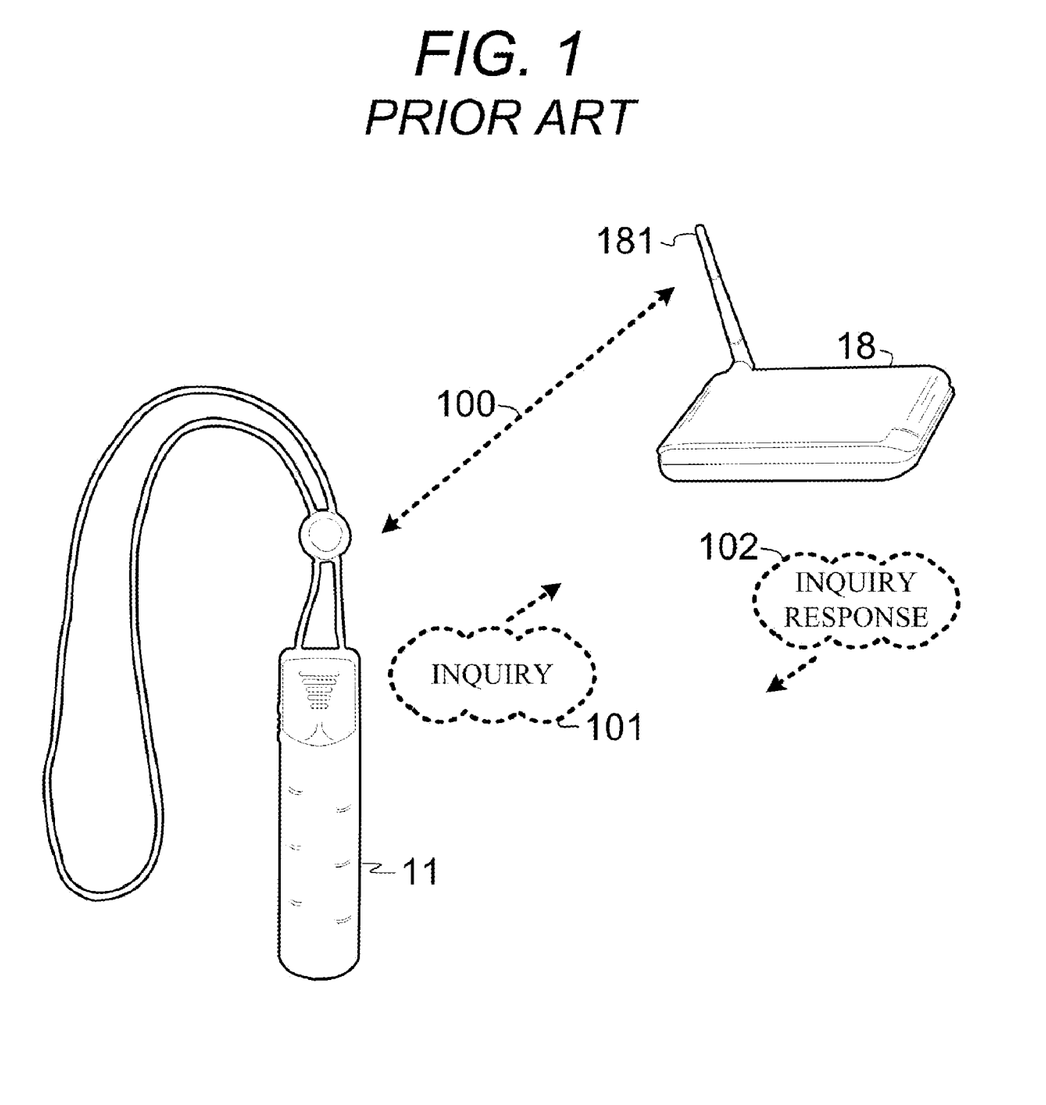
FIG. 1 depicts a wireless microphone using Bluetooth, a radio frequency digital protocol, to transmit an audio signal to a wireless audio access point.

Prior art FIG. 1 depicts a wireless microphone 11 that is sending audio, via a Bluetooth RF communication link 100, to a wireless audio access point 18 that is configured as a wireless communication access point. This application is suitable for a teacher, using this wireless microphone 11, to address students in a classroom setting. Such audio distribution using Bluetooth is well understood in the prior art and is similar to Bluetooth links between mobile telephones and microphone headsets, etc.

Bluetooth radios operate in the ISM (Industrial, Scientific, and Medical) band at 2.4 GHz (gigahertz). A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz (megahertz) bandwidth, defined analogous to the IEEE (Institute of Electronic and Electrical Engineers) 802.11 standard.

A connection between devices is made by a page message if the address is already known, or by an inquiry message followed by a page message if the address is unknown. The inquiry message enables the Bluetooth device to discover which other Bluetooth units are in range and what their addresses are, as well as other information such as their clocks and class-of-device. A "discoverable device" is a Bluetooth device in range that will respond to an inquiry (normally in addition to responding to a page). A discoverable device scans for inquiry messages, referred to as "inquiry scan." A "connectable device" is a Bluetooth device in range that will respond to a page.

Bluetooth communication is established first by having an unconnected Bluetooth (initiator) device broadcast an 'Inquiry' command that instructs all other Bluetooth devices in the immediate vicinity that are 'discoverable', to provide their respective Bluetooth addresses and clock values. Accordingly, the wireless microphone 11 broadcasts a Bluetooth inquiry 101 and the wireless audio access point 18 responds by broadcasting a Bluetooth inquiry response 102. Although not illustrated, those skilled in the art will appreciate that all other discoverable Bluetooth devices in the immediate vicinity will also broadcast their own Bluetooth inquiry responses.

Next, the still unconnected wireless microphone 11 pages each of the discovered Bluetooth devices and, based on contents of their responses, determines to which other Bluetooth device it desires to connect. A Bluetooth 'Master page response' is then sent to the desired device and the desired device accepts the connection. In this example, the wireless audio access point 18 is the desired device to which the wireless microphone 11 will attempt to connect. To complete this Bluetooth connection example, the final step is for the wireless audio access point 18 to take control of the Bluetooth link by becoming the 'master' and causing the wireless microphone 11 to become the 'slave'. This transfer of control is accomplished using a Bluetooth 'LMP_switch_req' command. The above described example of establishing a Bluetooth communication link is detailed further in Table 1.

TABLE 1

| Step | Message | Packet Type | Direction | Hopping Sequence | Access Code and Clock |
|---|---|---|---|---|---|
| -- Discover Bluetooth Devices -- | | | | | |
| a.1 | Inquiry | ID | Master to slave | Inquiry | Inquiry |
| a.2 (A) | Inquiry response | FHS | Slave to master | Inquiry response | Inquiry |
| . | . | . | . | . | . |
| . | . | . | . | . | . |
| a.2 (N) | Inquiry response | FHS | Slave to master | Inquiry response | Inquiry |
| -- Connect to Desired Device and Switch Roles (Master/Slave) -- | | | | | |
| b.1 | Page | ID | Master to slave | Page | Slave |
| b.2 | First slave page response | ID | Slave to master | Page response | Slave |
| b.3 | Master page response | FHS | Master to slave | Page | Slave |
| b.4 | Second slave page response | ID | Slave to master | Page response | Slave |
| b.5 | 1st packet master | POLL | Master to slave | Channel | Master |
| b.6 | LMP_slot_offset | DM1/DV | Slave to master | Channel | Master |
| b.7 | LMP_switch_req | DM1/DV | Slave to master | Channel | Master |
| b.8 | LMP_accepted | DM1/DV | Master to slave | Channel | Master* |

*After "LMP_accepted" message, the previous slave is now master and vice versa.

One drawback of the prior art is that the wireless audio access point 18 must always, or least periodically, be discoverable in order to establish a new link with a previously unconnected wireless microphone 11. In an alternative way of establishing a Bluetooth link, the wireless audio access point 18 issues the Bluetooth 'inquiry', either periodically to search for new devices or by a manual operator action. This alternative suffers from the drawback of either having to reserve Bluetooth bandwidth for the periodic search or of requiring a manual operator action at the wireless audio access point 18. In addition, both prior art alternatives will allow the devices to be discovered by extraneous Bluetooth devices outside of the audio system and also allow the audio system to discover these extraneous devices. Examples of such extraneous devices include, but are not limited to: cell phones and associated earpieces, desktop and laptop computers, fax machines, game controllers, keyboards and mice, personal digital assistants (PDA), and printers.

Table 2 below lists the ranges associated with the various classes of Bluetooth radios.

TABLE 2

| Class | Maximum Permitted Power mW (dBm) | Range (approximate) |
| --- | --- | --- |
| Class 1 | 100 mW (20 dBm) | ~100 meters |
| Class 2 | 2.5 mW (4 dBm) | ~10 meters* |
| Class 3 | 1 mW (0 dBm) | ~1 meter |

*In most cases the effective range of class 2 devices is extended if they connect to a class 1 transceiver, compared to a pure class 2 network. This is accomplished by the higher sensitivity and transmission power of Class 1 devices.

Figure 2:
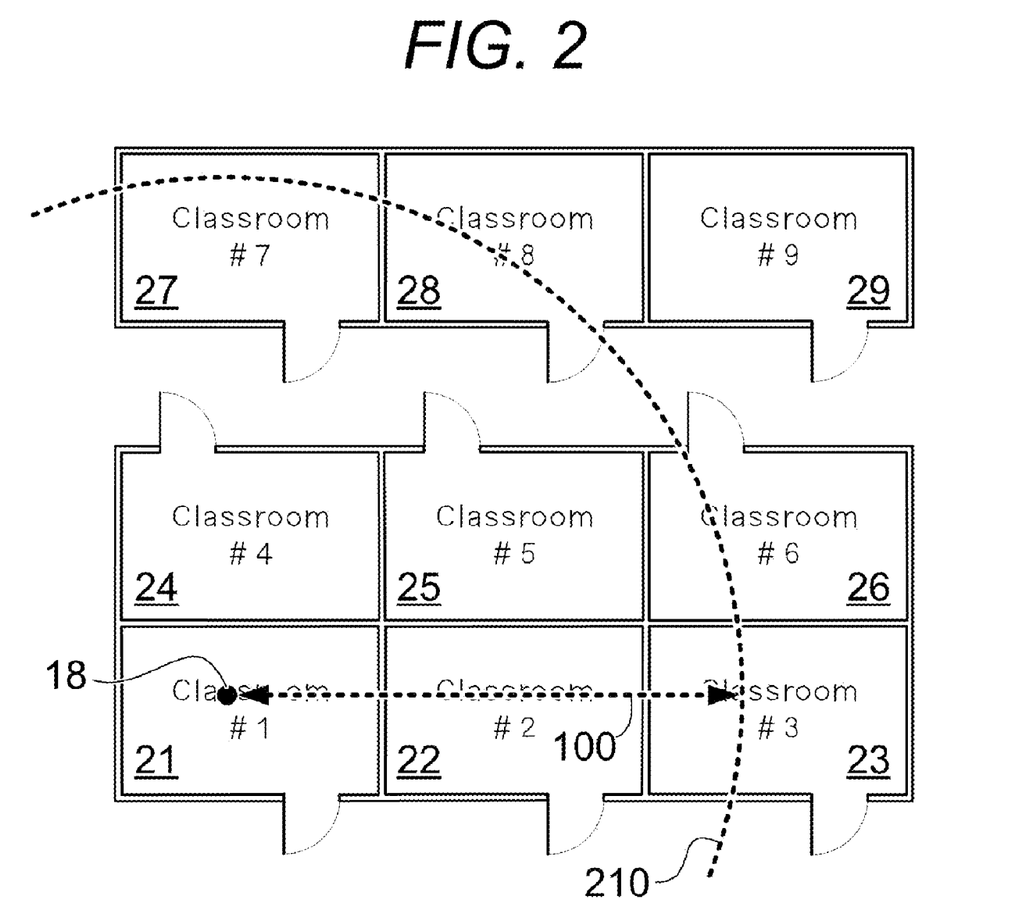
FIG. 2 depicts a portion of a school building having several classrooms and with the wireless range of a typical Bluetooth device thereupon superimposed.

FIG. 2 depicts a portion of a school building having several classrooms and with the wireless range of a typical Bluetooth device thereupon superimposed. This clearly shows that in a typical school setting, the range of a class 2 Bluetooth device 210, such as wireless audio access point 18, located in a first classroom 21 extends well beyond the confines of that classroom. As shown, the wireless audio access point 18 located in the first classroom 21 would interact, such as by trying to establish the Bluetooth RF communication link 100, with any Bluetooth devices located in a second classroom 22, a fourth classroom 24, and a fifth classroom 25. The Bluetooth wireless audio access point 18 also interacts with some portion of the Bluetooth devices in a third classroom 23, a sixth classroom 26, a seventh classroom 27, and an eighth classroom 28. In fact, in the typical school layout illustrated only devices in a ninth classroom 29 would not interact with the Bluetooth wireless audio access point 18 in the first classroom 21, but even that is not assured, as described above in the table notes for Table 2.

Figure 3:
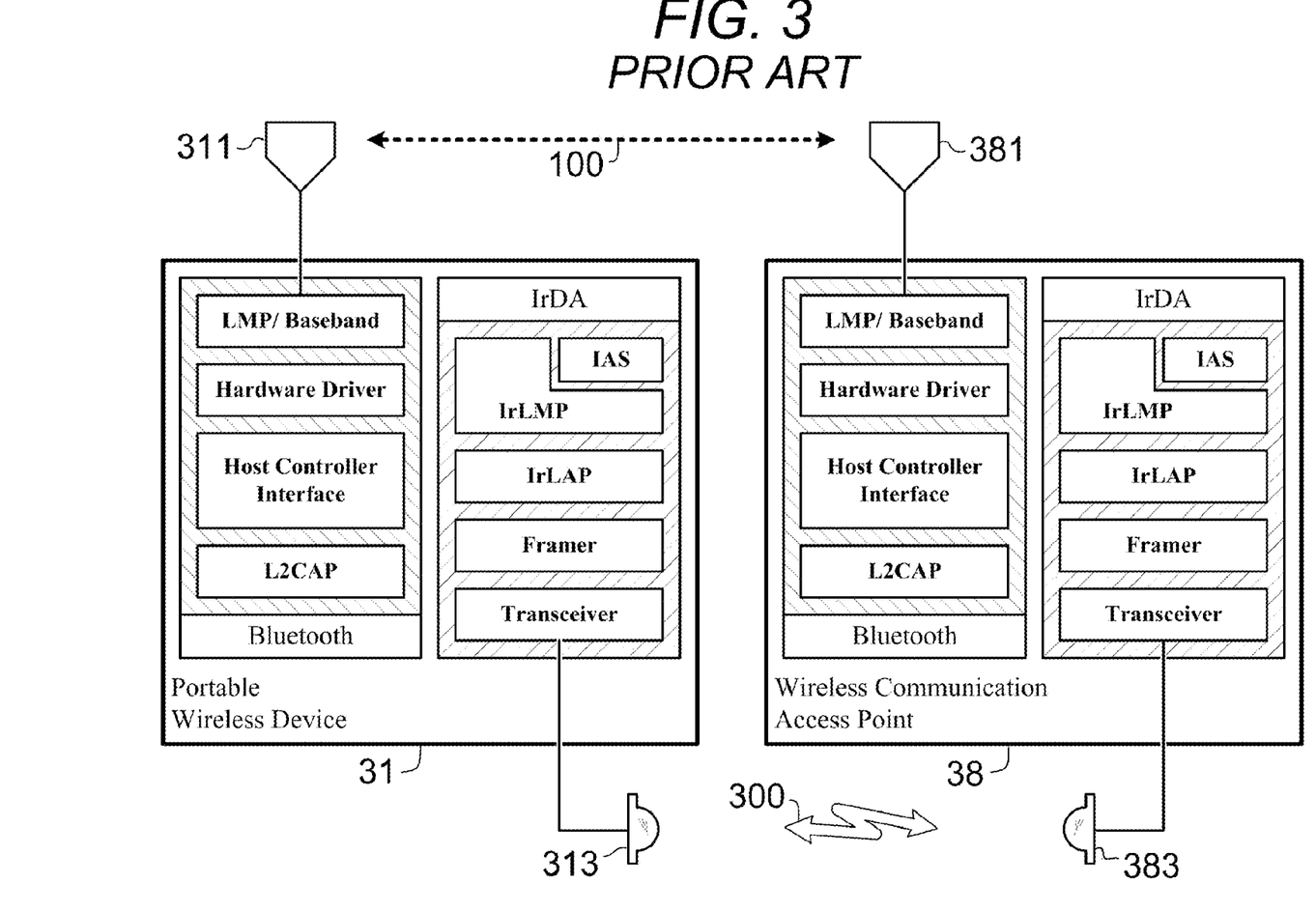
FIG. 3 depicts a portable wireless device communicating with a wireless communication access point using Bluetooth and additionally including IrDA, an infrared digital protocol, in order to accelerate Bluetooth connection times in accordance with a known method.

Prior art FIG. 3 depicts a portable wireless device communicating with a wireless communication access point using Bluetooth and additionally including IrDA, an infrared digital protocol, in order to accelerate Bluetooth connection times in accordance with a known method. For example, the Bluetooth Specification provides for an out of band (OoB) association to discover the devices as well as to exchange or transfer cryptographic numbers used in the pairing process.

As shown in FIG. 3, a portable wireless device may include both a Bluetooth radio and an Infrared Data Association (IrDA) high speed infrared protocol. An IrDA communication link 300 is a low power infrared (IR) signal having high-speed characteristics (i.e. baud rate of 9600 baud or greater) and short range (i.e. limited to 1 meter). Portable wireless device 31 includes both a Bluetooth RF antenna 311 and an IrDA infrared transceiver 313. Similarly, wireless communication access point 38 also includes both a corresponding Bluetooth RF antenna 381 and a corresponding IrDA infrared transceiver 383.

Now, the prior art simply does not provide an effective means of limiting Bluetooth communications to the confines of a single classroom. Although the prior does include certain provisions for out of band (OoB) communications, including IrDA, these provisions are not suitable for a classroom audio system where communication between a wireless microphone and a wireless audio access point is based on collocation within the confines of the same classroom.

Thus, attempting to use an existing Bluetooth wireless microphone device in a multiple classroom setting, where each classroom potential has its own wireless audio access point, presents a number of problems. Finding a solution to these problems is made more complex because the solution must be substantially compliant with the Bluetooth specification and also be low power.

SUMMARY OF THE INVENTION

It is to be understood that both the general and detailed descriptions that follow are exemplary and explanatory only and are not restrictive of the invention.

DISCLOSURE OF INVENTION

Accordingly, a need exists for a classroom audio system that allows a teacher to move between several classrooms and retain use of his/her personal wireless microphone. A need also exists for a system and/or method that can satisfy the above need and that can reduce the time required for examining all the available choices prior to making a selection. In particular, a need exists for a system and/or method that can satisfy the above needs and that is consistent with the Bluetooth specification, and that can be implemented in Bluetooth-enabled devices. The embodiments of the present invention provide these advantages and others not specifically mentioned above but described in the sections to follow.

According to a first aspect, the present invention provides a wireless communication system comprising a portable wireless device and a wireless communication access point that manages radio frequency digital communications based on a low baud rate infrared beacon signal. The portable wireless device includes a radio frequency digital transceiver, an infrared beacon transmitter, and a control switch. The infrared beacon transmitter transmits a low baud rate infrared beacon signal at a data rate greater than 400 baud and less than 9600 baud. The wireless communication access point includes a radio frequency digital transceiver that communicates with said radio frequency digital transceiver of said portable wireless device and an infrared sensor that receives the low baud rate infrared beacon signal. The wireless communication access point manages radio frequency digital communications based on the low baud rate infrared beacon signal.

According to a second aspect, the present invention provides a wireless audio distribution system suitable for use in a classroom setting. This audio distribution system includes a RF wireless microphone that further a Bluetooth transceiver, an infrared beacon transmitter, a control switch, and a microphone element. This audio distribution system also includes a wireless audio access point that further comprises a Bluetooth transceiver and an infrared sensor. The infrared beacon transmitter transmits a first IR code upon activation of the control switch and transmits a second IR code, which has a value assigned by the wireless audio access point. The RF wireless microphone and the wireless audio access point establish Bluetooth communication upon detection of the first IR code at the wireless audio access point. The RF wireless microphone and the wireless audio access point terminate Bluetooth communication upon a first predetermined condition of failing to receive the second IR code. The RF wireless microphone and the wireless audio access point reestablish Bluetooth communication upon a second predetermined condition of receiving said second IR code. The wireless audio access point mutes the audio output from the microphone element upon a third predetermined condition of failing to receive the second IR code. The wireless audio access point enables the audio output from the microphone element upon a fourth predetermined condition of receiving the second IR code.

According to a third aspect, the present invention provides a method for selectively communicating with a portable wireless device as it moves throughout a predefined area. This method comprises the steps of: providing the portable wireless device, providing a plurality of a wireless communication access points, transmitting a first IR code from the portable wireless device to a first wireless communication access point, selecting a specific RF communication channel based on the contents of the first IR code, and establishing communication between the portable wireless device and said first wireless communication access point on the specific RF communication channel. The plurality of a wireless communication access points are located throughout the predetermined area. Each one of said wireless communication access points is located at a predetermined position, is capable of wireless reception and transmission on multiple RF communication channels, and is capable of receiving IR codes. The first IR code comprises an infrared signal at a data rate of between 400 and 9600 baud.

According to a fourth aspect, the present invention provides a method for A method for selectively distributing audio from a wireless microphone to an audio component. This method comprises the steps of: providing the wireless microphone and audio distribution component, transmitting a first IR code from the wireless microphone to the audio distribution component and simultaneously attempting to reestablish Bluetooth communication with a previously connected audio distribution component when an operator of the wireless microphone actuates a switch, establishing Bluetooth communication between wireless microphone and the audio distribution component, transmitting a recognized value from the audio distribution component to the wireless microphone via Bluetooth communication, assigning (step 703) the recognized value to the second IR code at the wireless microphone, transmitting (step 704), upon request, the second IR code from the wireless microphone to the audio distribution component, conditionally terminating and reestablishing Bluetooth communications based on the presence of the second IR code, and conditionally muting and enabling audio based on the presence of the second IR code. The wireless microphone transmits and receives Bluetooth messages including audio data. The wireless microphone also transmits an infrared beacon signal. The first IR code is particularly suitable to facilitate fast pairing. The Bluetooth communication between the wireless microphone and the audio distribution component is conditionally terminated when the second IR code is not received, at the audio distribution component, for a first predetermined time increment. The Bluetooth communication between the wireless microphone and the audio distribution component is conditionally reestablished the second IR code, having a recognized value, is received at the audio distribution component. The audio from the microphone is conditionally muted when the second IR code is not received at the audio distribution component for a second predetermined time increment. The audio from the microphone is conditionally enabled when the second IR code, having a recognized value, is received at the audio distribution component.

The present invention seeks to overcome or at least ameliorate one or more of several problems, including but not limited to: using an RF wireless microphone in multiple classrooms.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL
VIEWS OF THE DRAWING

Prior art

Prior art

LIST OF REFERENCE NUMBERS FOR THE
MAJOR ELEMENTS IN THE DRAWING

The following is a list of the major elements in the drawings in numerical order.

11  RF wireless microphone (e.g. Bluetooth)
18  wireless audio access point
21  first classroom
22  second classroom
23  third classroom
24  fourth classroom
25  fifth classroom
26  sixth classroom
27  seventh classroom
28  eighth classroom
29  ninth classroom
31  portable wireless device (i.e. Bluetooth and IrDA)
38  wireless communication access point (i.e. Bluetooth and IrDA)
41  RF wireless microphone including an infrared beacon
48  wireless audio access point with infrared sensor
100 Bluetooth RF communication link
101 Bluetooth inquiry
102 Bluetooth inquiry response
181 antenna (p/o wireless audio access point 18)
210 range of class 2 Bluetooth device (from classroom 21)
300 IrDA communication link
311 antenna (p/o wireless device 31)
313 IrDA infrared transceiver (p/o wireless device 31)
381 antenna (p/o access point 38)
383 IrDA infrared transceiver (p/o access point 38)
400 low baud rate infrared beacon signal
401 first IR Code (carried on infrared beacon signal 400)
411 antenna (p/o wireless device 40)
413 infrared beacon transmitter (p/o RF wireless microphone 41)
414 control switch (p/o RF wireless microphone 41)

-continued

| | |
|---|---|
| 415 | Bluetooth transceiver (p/o RF wireless microphone 41) |
| 417 | microphone element (p/o RF wireless microphone 41) |
| 481 | antenna (p/o wireless audio access point 48) |
| 483 | infrared (IR) sensor (p/o wireless audio access point 48) |
| 485 | Bluetooth transceiver (p/o wireless audio access point 48) |
| 487 | audio output circuitry (p/o wireless audio access point 48) |
| 700 | process flowchart |
| 701 | (step of) transmitting a first IR code |
| 702 | (step of) establishing Bluetooth communication link |
| 703 | (step of) assigning a second IR code |
| 704 | (step of) transmitting the second IR code upon request |
| 705 | (condition) is $2^{nd}$ IR Code missing? (at sensor 483) |
| 706 | (condition) is $2^{nd}$ IR Code still missing? (at sensor 483) |
| 707 | (step of) conditionally terminating Bluetooth communication link |
| 708 | (step of) conditionally muting audio |
| 709 | (step of) conditionally enabling audio |

DETAILED DESCRIPTION OF THE INVENTION

The embodiments of the present invention are described primarily in a context of a classroom audio distribution system that includes a number of wireless audio access points that may be in relatively close vicinity to one another with respect to a Bluetooth Class 2 device that has a range of approximately in which devices and systems are coupled using wireless links, and specifically with regard to devices and systems compliant with the Bluetooth technology. Bluetooth is the code name for a technology specification for small form factor, low-cost, short-range radio links between personal computers (PCs), personal digital assistants (PDA), mobile phones, and other devices.

In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

MODE(S) FOR CARRYING OUT THE INVENTION

The preferred embodiment of the present invention is described herein in the context in which devices and systems are coupled using wireless links, and specifically with regard to devices and systems compliant with the Bluetooth technology, but is not limited thereto, except as may be set forth expressly in the appended claims.

Figure 4:
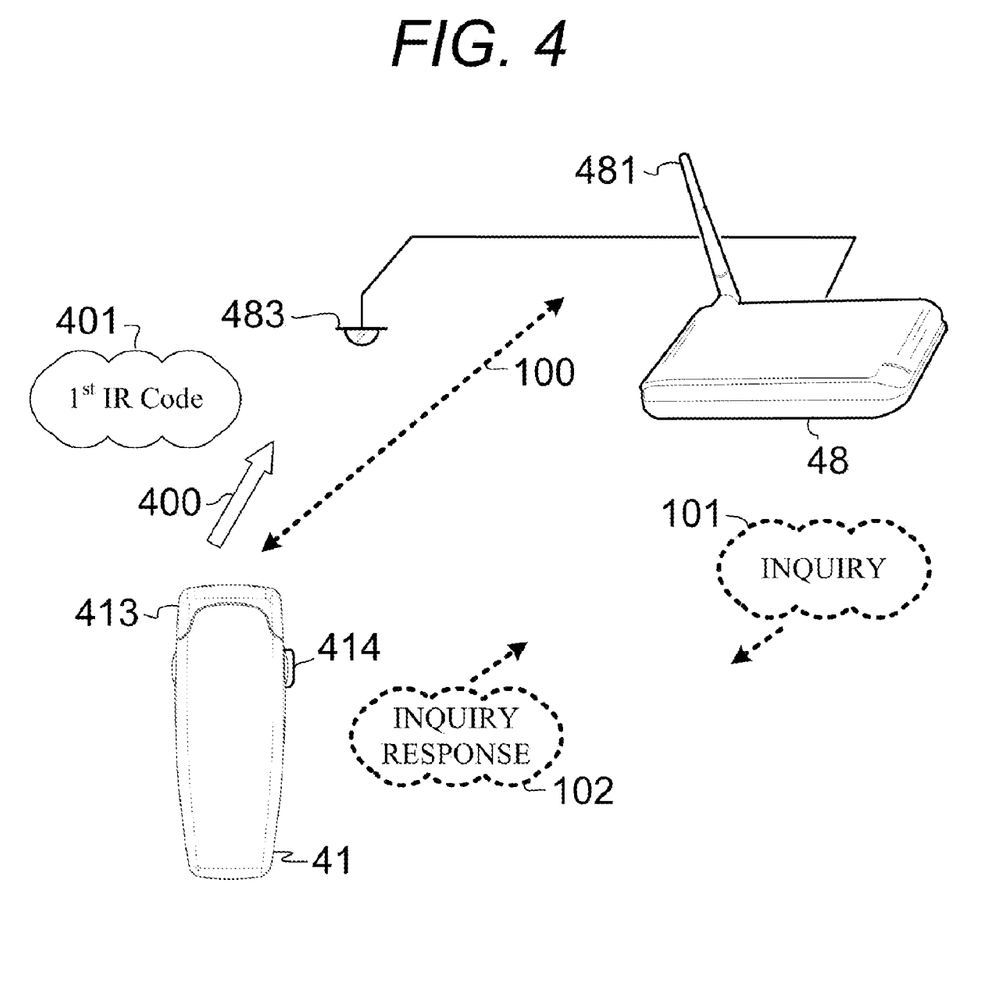
FIG. 4 depicts a classroom audio presentation system that uses a single RF wireless microphone that further includes an infrared beacon for presence detection in accordance with one illustrative embodiment of the present invention.

Refer first to FIG. 4. The present invention can be embodied as a wireless classroom audio presentation system that includes at least one RF wireless microphone 41 that works in conjunction with a wireless audio access point 48. This wireless audio access point is located in such a position within a classroom, such as being ceiling-mounted, so that it is generally in a line of sight with all interior portions of the classroom and out of a line of sight from the interior portions of other classrooms. For example, a wireless audio access point 48 mounted on the ceiling of a first classroom 21, as shown in FIG. 2, should not be visible to an occupant of a second classroom 22.

In a preferred embodiment, the RF wireless microphone 41 is a Bluetooth microphone that additionally incorporates an infrared beacon transmitter 413. This infrared beacon transmitter 413 is designed to transmit a low baud rate infrared beacon signal 400 at both a low power setting and a high power setting. The wireless audio access point 48 detects the presence of RF wireless microphone 41 within the same classroom by verifying that the microphone is within a direct line of sight, of infrared (IR) sensor 483, by causing the RF wireless microphone to transmit an infrared beacon code at a the low power setting or alternatively within an indirect line of sight by causing transmission of this infrared beacon code at a high power setting. Advantageously, this use of two power settings conserves battery life.

In the Bluetooth embodiment, a Bluetooth RF communication link 100 is established between the RF microphone 41 and the wireless audio access point 48 as follows. First, the person operating the RF microphone 41, such as a school teacher, activates a control switch 414 which causes the RF wireless microphone 41 to emit a first IR Code 401 from its infrared beacon transmitter 413. Next, the wireless audio access point 48 detects this first IR Code 401 at its infrared sensor 483 and in response thereto transmits a Bluetooth inquiry 101. Finally, the RF wireless microphone 41 responds with a Bluetooth inquiry response 102 using techniques known to those skilled in the art. Advantageously, this allows the RF wireless microphone 41 to become discoverable for a very short time duration, namely the duration required to become recognized by the wireless audio access point 48 which is functioning as a Bluetooth 'master'. In yet a further embodiment, the first IR code 401 is a long code particularly adapted to facilitate fast Bluetooth pairing of the RF wireless microphone 41 and the wireless audio access point 48. In one embodiment, this long code includes the Bluetooth address of wireless microphone 41.

Those skilled in the art will recognize that the technique of using a low baud rate infrared beacon signal 400 including a first IR code 401 in order to establish a Bluetooth communication link 100 to avoid having to remain discoverable to extraneous Bluetooth devices can be extended to other wireless communication systems and various other portable wireless devices.

The inventor has discovered that using a low baud rate infrared beacon signal that includes relatively simple (short bit pattern) codes provides significant advantages as compared to a high baud rate digital infrared two communication, such as IrDA. These advantages include a greater optical range, such as allowing for both direct and indirect lines of sight, and lower power consumption at the infrared transmitter. These advantages can be significantly enhanced by managing both the power level of the infrared beacon transmitter and the duty cycle of the IR code transmission, such as for example once every 2 minutes. Suitable data rates for such a low baud rate infrared beacon signal 400 are between 400 baud and 9600 baud with 1200 baud having been shown to provide satisfactory operational characteristics.

Figure 5:
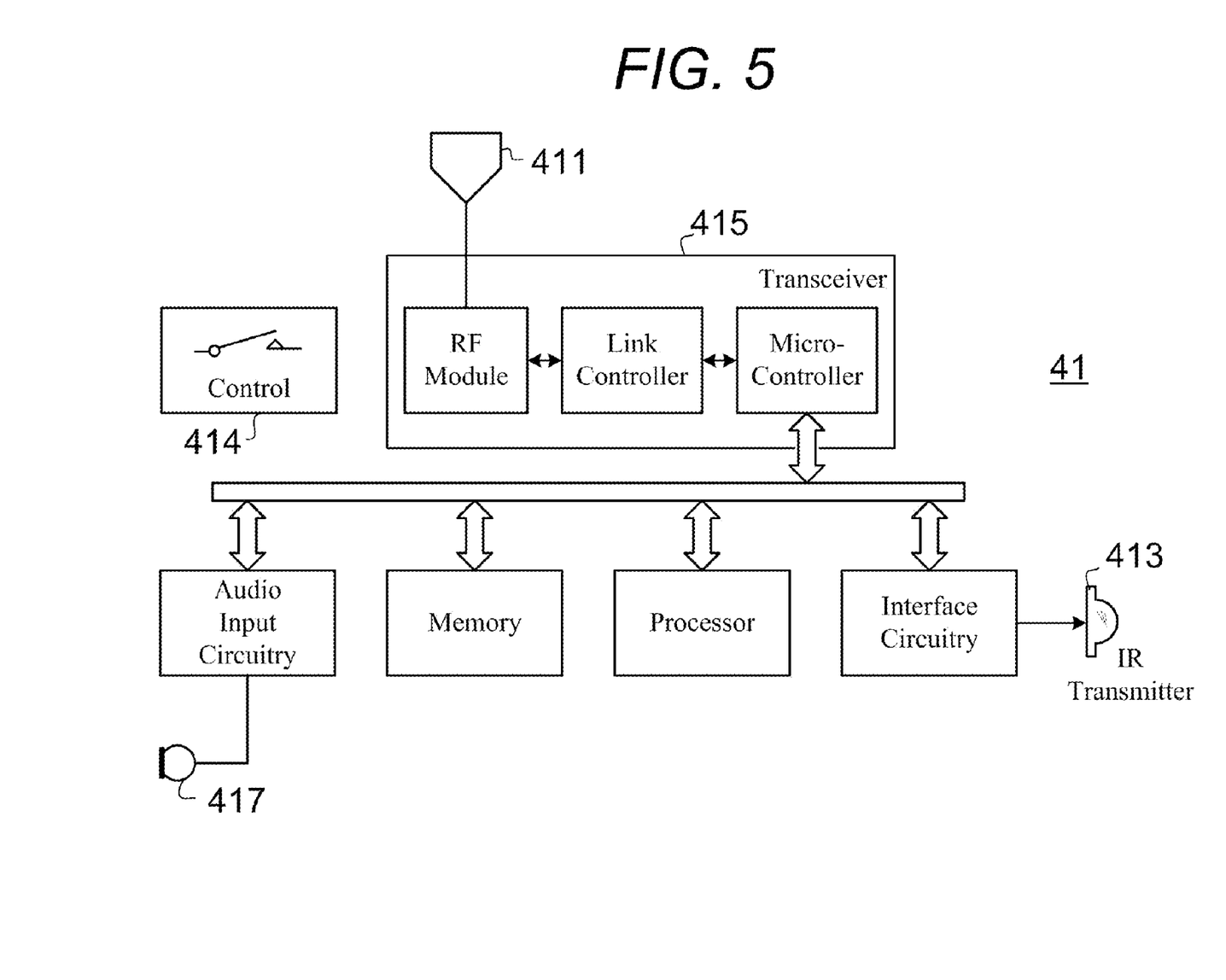
FIG. 5 illustrates further details for the wireless microphone of FIG. 4.

Refer now to FIG. 5 which shows an exemplary block diagram of certain functional blocks within the RF wireless microphone 41. The primary functional blocks shown include a Bluetooth transceiver 415, an infrared beacon transmitter 413, and a control switch 414 that provide the functionality previously described above. In addition to these functional blocks, the RF wireless microphone 41 includes an antenna 411 associated with Bluetooth transceiver 415, a microphone element 417 and associated audio input circuitry, and processing and memory elements typically found in modern electronic equipment.

Figure 6:
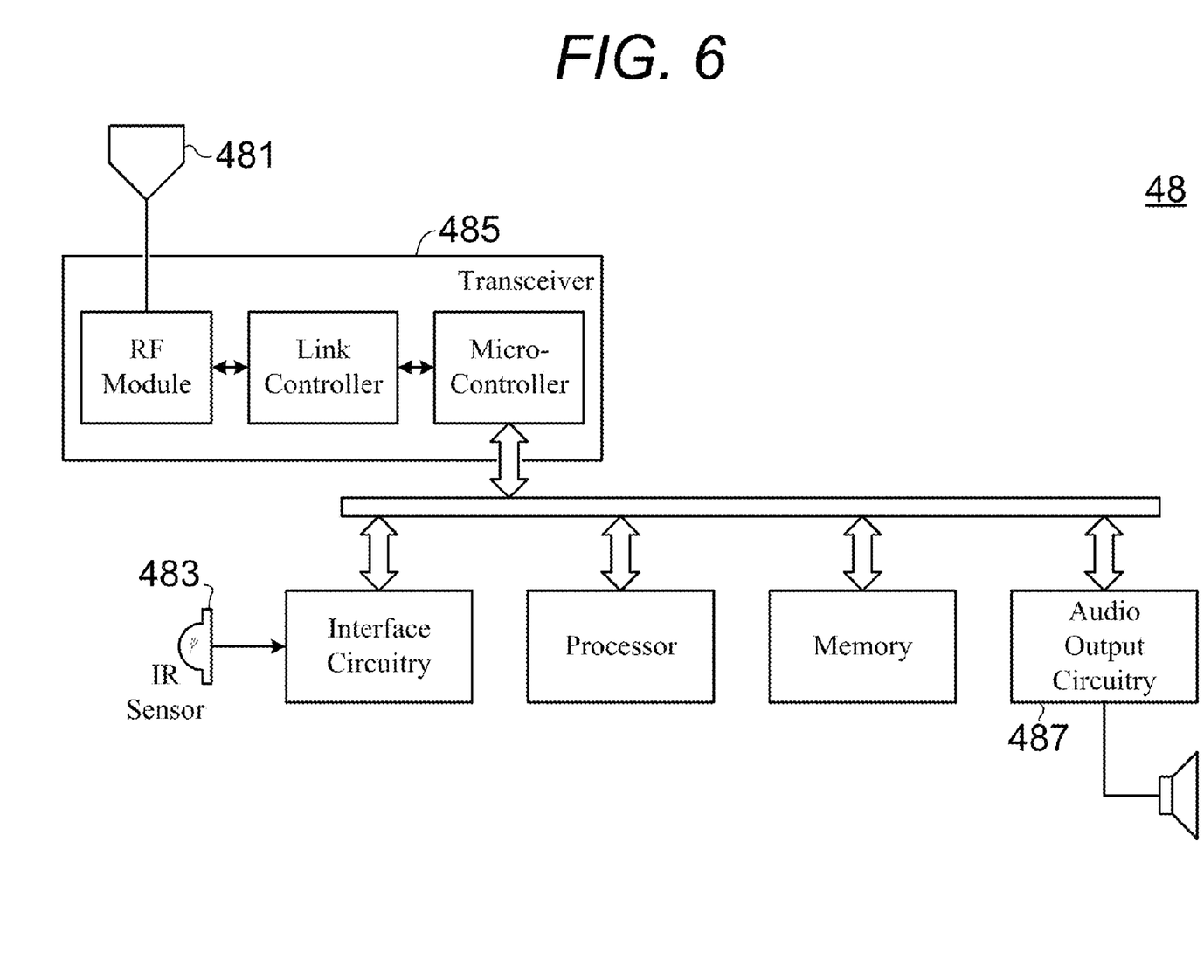
FIG. 6 illustrates further details for the wireless audio access point (i.e. wireless communication access point) of FIG. 4.

Now refer to FIG. 6, which shows an exemplary block diagram of certain functional blocks within the wireless audio access point 48. The primary functional blocks shown include a Bluetooth transceiver 485 and an infrared (IR) sensor 483 that provide the functionality previously described above. In addition to these functional blocks, the wireless audio access point 48 includes an antenna 481 associated with Bluetooth transceiver 485, audio output circuitry 487, and processing and memory elements typically found in modern electronic equipment.

Figure 7:
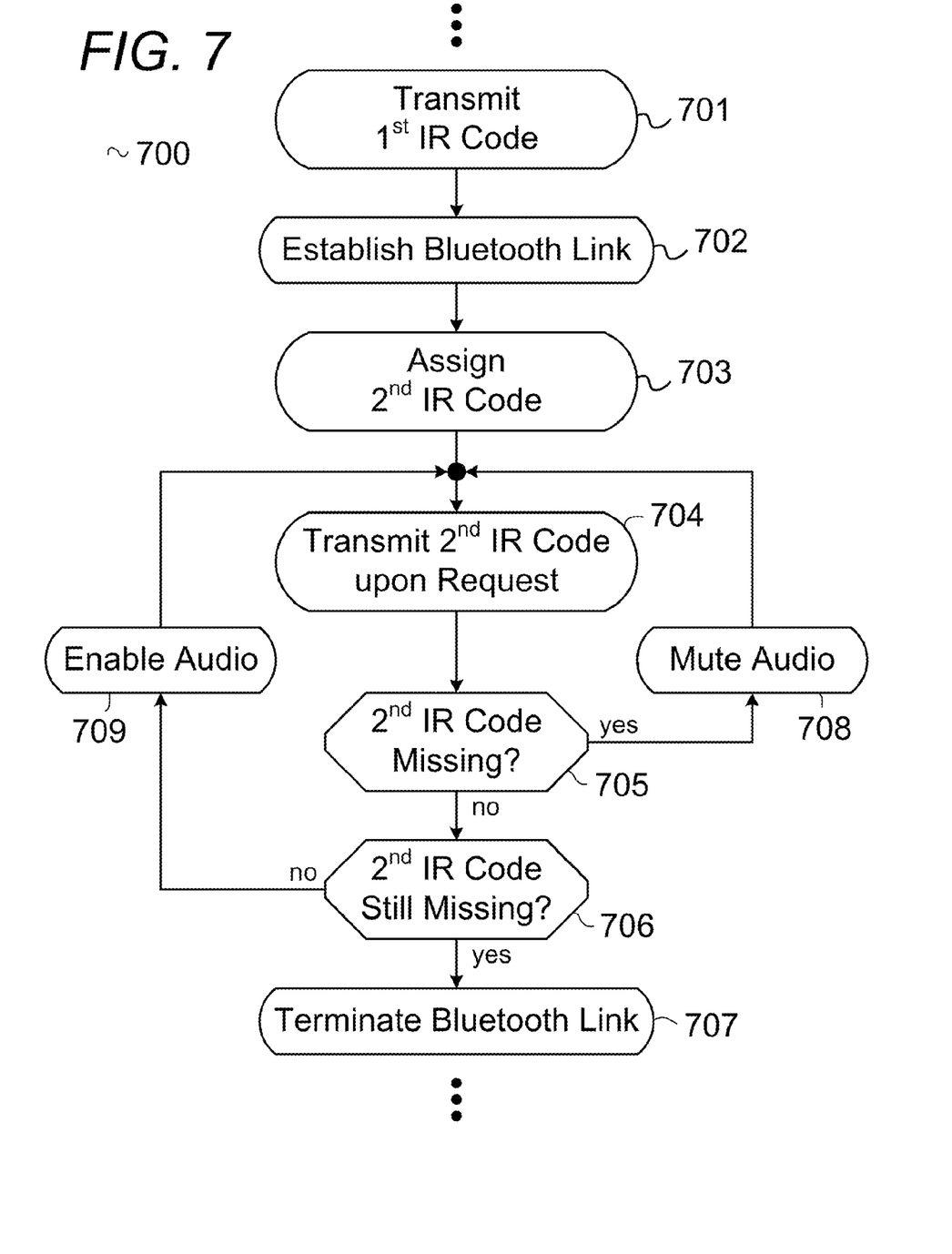
FIG. 7 is a flowchart of a process for intelligently connecting to a wireless access point and maintaining this connection based on the presence of an infrared signal in accordance with one embodiment of the present invention.

FIG. 7 shows a process flowchart 700 for selectively communicating with a portable wireless device as it moves throughout a predefined area. In one illustrative embodiment, the portable wireless device is a wireless microphone and the predefined area is a portion of a school building. Those skilled in the art will recognize that the present invention is also suitable for use in other predefined areas, such as, but not limed to: conference centers and hotels. According to the present invention, the predefined area includes a number of wireless communication access points within the area.

Flowchart 700 includes processes of the present invention which, in one embodiment, are carried out by a processor and electrical components under the control of computer readable and computer executable instructions. The computer readable and computer executable instructions may reside, for example, in data storage features such as computer usable memory or in any other type of computer readable medium. Although specific steps are disclosed in flowchart 700, such steps are exemplary. That is, the present invention is well suited to performing various other steps or variations of the steps recited in FIG. 7. Within the present embodiment, it should be appreciated that the steps of flowchart 700 can be performed by software or hardware or any combination of software and hardware.

Refer now to FIG. 7 and FIG. 4. According to an illustrative embodiment of the present invention, an RF communication link, such as a Bluetooth RF communication link 100 is established (step 702) only after the portable wireless device 41 has transmitted (step 701) a first IR code 401 and this first IR code is received at the wireless communication access point 48. Establishing (step 702) the Bluetooth link entails the wireless communication access point 48 transmitting a Bluetooth inquiry 101 and the portable wireless device transmitting a Bluetooth inquiry response 102. As described above, the first IR code may be transmitted (step 701) in response to an operator action. The inventor has discovered that it is advantageous to use relatively high powered infrared signal at a low data rate, such as between 400 and 9600 baud because this signal has a reasonable range for use within a single room and is reasonably low-powered, especially if transmitted at a low duty cycle. Those skilled in the art will recognize that the present invention generally selects a specific RF communication channel based on the contents of the first IR code and that a particular Bluetooth frequency hopping scheme is only one instance of a specific RF communication channel that is established in accordance with the present invention.

In a preferred embodiment, the wireless access point 48 assigns (step 703) a second IR code for the portable wireless device 41 to transmit (step 704) upon request. Advantageously, due to the propagation nature of the infrared beacon signal 400, this allows the wireless access point 48 to determine whether the portable wireless device is within the confines of the same room, such as a school classroom.

Now consider embodiments of the present invention in which the portable wireless device 41 is a wireless microphone. In these embodiments it is desirable to mute the audio from the wireless microphone 41 when, for example a teacher giving a lecture in a first classroom steps out of that classroom. Accordingly, in order to determine whether the wireless microphone 41 is still collocated; the wireless access point 48, such as a wireless audio access point, periodically requests that the wireless microphone 41 transmit (step 704) the second IR code. If the second IR code is not received (i.e. 'missing') at the wireless audio access point 48 add more specifically at IR Sensor 483, shown in FIG. 6, then the audio from the wireless microphone is muted (step 708). Note that the associated audio data stream is still being transmitted from the wireless microphone 41 to the wireless audio access point 48, but is being muted in the audio output circuitry 487, shown in FIG. 6.

Next, the wireless audio access point 48 continues to request for the wireless microphone 41 to transmit the second IR Code. In certain embodiments the wireless audio access point 48 will request that the second IR Code be transmitted at a 'high power' setting so that collocation can be determined even if the infrared beacon transmitter 413 is not in a direct line-of-sight with the IR sensor 483.

If it is determined that the second IR code is 'still missing' after periodic retries, requests for higher power settings, and the like, then the RF communication link, such as Bluetooth, is terminated (step 707). If, on the other hand, the second IR code is now detected, then the audio from microphone 41, is enabled (step 709).

In summary, embodiments of the present invention provide a user-friendly system and method for using a wireless microphone in multiple classrooms while monitoring whether the wireless microphone is collocated in a classroom with a wireless audio access point while preventing undesired or extraneous audio.

INDUSTRIAL APPLICABILITY

To solve the aforementioned problems, the present invention includes a method for intelligently selecting a Bluetooth access point from a plurality of available points.

LIST OF ACRONYMS USED IN THE DETAILED DESCRIPTION OF THE INVENTION

The following is a list of the acronyms used in the specification in alphabetical order.

| | |
|---|---|
| AP | access point |
| GHz | gigahertz |
| IEEE | Institute of Electronic and Electrical Engineers |
| IR | infrared |
| IrDA | Infrared Data Association |
| ISM | Industrial, Scientific, and Medical (radio frequency band) |
| OoB | Out of Band |
| PC | personal computer |
| PDA | personal data assistant |
| RAM | random access memory |
| RF | radio frequency |
| ROM | read-only memory |
| SIG | special interest group |

ALTERNATE EMBODIMENTS

Alternate embodiments may be devised without departing from the spirit or the scope of the invention. For example, certain embodiments may use digital RF communication that uses protocols other than Bluetooth.

What is claimed is:

1. A wireless communication system comprising:
   (a) a portable wireless device (41) that further comprises
      (i) a radio frequency digital transceiver (415), (ii) an infrared beacon transmitter (413) adapted to transmit a low baud rate infrared beacon signal (400) at a data rate greater than 400 baud and less than 9600 baud, and (iii) a control switch (414);

(b) a wireless communication access point (48) configured to determine whether it is collocated in a room with the portable wireless device, the wireless communication access point comprising (i) a radio frequency digital transceiver (485) adapted to communicate with said radio frequency digital transceiver of said portable wireless device, and (ii) an infrared sensor (483) adapted to receive said low baud rate infrared beacon signal; and (c) wherein the wireless communication access point is configured to manage radio frequency digital communications based on said low baud rate infrared beacon signal.

2. The wireless communication system of claim 1 wherein:
(a) the radio frequency digital transceivers, of said portable wireless device and said wireless communication access point, mutually communicate using Bluetooth protocol.

3. The wireless communication system of claim 1 wherein:
(a) the low baud rate infrared beacon signal has a data rate of 1200 baud.

4. The wireless communication system of claim 1 wherein:
(a) the low baud rate infrared beacon signal substantially complies with RC-5 infrared protocol.

5. The wireless communication system of claim 1 wherein:
(a) the infrared transmitter is adapted to transmit a first IR code (401) upon activation of said control switch; and
(b) the infrared transmitter is further adapted to transmit a second IR code.

6. The wireless communication system of claim 5 wherein:
(a) the radio frequency digital transceivers of said portable wireless device and said wireless communication access point establish mutual communication only after the first IR code is detected at the wireless communication access point.

7. The wireless communication system of claim 6 wherein:
(a) the first IR code is a long code particularly adapted to facilitate fast pairing of the portable wireless device and the wireless communication access point.

8. The wireless communication system of claim 5 wherein:
(a) the second IR code is transmitted in response to a request from the wireless communication access point.

9. The wireless communication system of claim 5 wherein:
(a) the second IR code has a value assigned by the wireless communication access point.

10. The wireless communication system of claim 5 wherein:
(a) the second IR code is transmitted periodically.

11. The wireless communication system of claim 6 wherein:
(a) the portable wireless device further comprises a microphone element (417) and the radio frequency digital transceiver of said portable wireless device is further adapted to transmit audio; and
(b) the wireless communication access point further comprises audio output circuitry (487) and the radio frequency digital transceiver of said wireless communication access point is further adapted to receive audio.

12. The wireless communication system of claim 5 wherein:
(a) the wireless communication access point is further adapted to mute an audio output upon a predetermined condition of failing to receive said second IR code.

13. The wireless communication system of claim 5 wherein:
(a) the wireless communication access point is further adapted to enable an audio output upon a predetermined condition of receiving said second IR code.

14. The wireless communication system of claim 6 wherein:
(a) the portable wireless device further comprises remote control buttons.

15. The wireless communication system of claim 14 wherein:
(a) the radio frequency digital transceiver of said portable wireless device is further adapted to transmit remote control command sequences.

16. The wireless communication system of claim 15 wherein:
(a) the command sequences are suitable for audio/visual control and further comprise: volume control; channel changing; and audio muting.

17. The wireless communication system of claim 14 wherein:
(a) the infrared transmitter of said portable wireless device is further adapted to transmit remote control command sequences.

18. The wireless communication system of claim 17 wherein:
(a) the command sequences are suitable for audio/visual control and further comprise: volume control; channel changing; and audio muting.

19. A method for selectively communicating with a portable wireless device as it moves throughout a predefined area, said method comprising the steps of:
(a) providing said portable wireless device;
(b) providing a plurality of a wireless communication access points located throughout the predetermined area, with each one of said wireless communication access points
(i) being located at a corresponding predetermined position,
(ii) being capable of wireless reception and transmission on multiple RF communication channels, and
(iii) being capable of receiving IR codes;
(c) transmitting (step 701) a first IR code from the portable wireless device to a first wireless communication access point using RC-5 infrared protocol, said first IR code comprising an infrared signal at a data rate of between 400 and 9600 baud;
(d) selecting a specific RF communication channel based on the contents of the first IR code;
(e) establishing communication (step 702) between the portable wireless device and said first wireless communication access point on the specific RF communication channel.

20. The method according to claim 19, wherein the predetermined area is a portion of a building selected from the group consisting of: conference centers, hotels, and schools.

21. The method according to claim 19, wherein each of said corresponding positions is a location within one of a plurality of rooms within said building.

22. The method according to claim 19 wherein:
(a) the radio frequency digital transceiver of said portable wireless device and the radio frequency digital transceiver of said first wireless communication access point communicate using Bluetooth protocol.

23. The method according to claim 19 wherein:
(a) the portable wireless device is adapted to transmit a low baud rate infrared signal at a data rate of 1200 baud.

24. The method according to claim 19 wherein:
  (a) the first IR code is a long code particularly adapted to facilitate fast pairing of the portable wireless device and the wireless communication access point.

25. The method according to claim 19, wherein:
  (a) the step of transmitting a first IR code from the portable wireless device is executed when an operator of said portable wireless device actuates a switch.

26. The method according to claim 25, further comprising the step of:
  (a) simultaneously attempting to reestablish RF communication with a previously connected wireless access point upon actuation of said switch by said operator.

27. The method according to claim 19, further comprising the step of:
  (a) periodically transmitting (step 704) a second IR code from the portable wireless device to the first wireless communication access point, said second IR code comprising a low baud rate infrared signal at a data rate greater than 400 baud and less than 9600 baud.

28. The method according to claim 27 wherein:
  (a) the second IR code is a short code particularly adapted to act as "Keep-Alive" beacon signal.

29. The method according to claim 27, wherein the second IR code has a recognized value.

30. The method according to claim 29, further comprising the steps of:
  (a) transmitting the recognized value from the wireless communication access point to the portable wireless device via RF communication; and
  (b) assigning (step 703) the recognized value to the second IR code at the portable wireless device.

31. The method according to claim 27, further comprising the steps of:
  (a) conditionally terminating (step 707) RF communication between the portable wireless device and the first wireless communication access point upon not receiving the second IR code, at said first wireless communication access point, for a first predetermined time increment.

32. The method according to claim 31, further comprising the step of:
  (a) conditionally reestablishing RF communication between the portable wireless device and said first wireless communication access point on the specific RF communication channel upon receiving the second IR code, having said recognized value, at said first wireless communication access point.

33. The method according to claim 27, wherein:
  (a) the portable wireless device comprises a microphone.

34. The method according to claim 33, further comprising the step of:
  (a) conditionally muting (step 708) audio from said microphone upon not receiving the second IR code, at said first wireless communication access point, for a second predetermined time increment.

35. The method according to claim 34, further comprising the step of:
  (a) conditionally enabling (step 709) audio from said microphone upon receiving the second IR code, having said recognized value, at said first wireless communication access point.

* * * * *